(12) United States Patent
Bolyukh et al.

(10) Patent No.: US 8,627,454 B2
(45) Date of Patent: Jan. 7, 2014

(54) DYNAMIC QUOTA-BASED ENTERTAINMENT MANAGER

(75) Inventors: Yuriy Bolyukh, Trophy Club, TX (US); Aamer Charania, Flower Mound, TX (US); Syed Zafar Beyabani, Irving, TX (US); Olena Bolyukh, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 704 days.

(21) Appl. No.: 12/416,483

(22) Filed: Apr. 1, 2009

(65) Prior Publication Data

US 2010/0257601 A1    Oct. 7, 2010

(51) Int. Cl.
*G06F 7/04* (2006.01)
*G06F 17/30* (2006.01)
*G06F 12/00* (2006.01)
*G06F 12/14* (2006.01)
*G06F 13/00* (2006.01)
*G11C 7/00* (2006.01)
*H04N 7/16* (2011.01)
*H04N 9/80* (2006.01)

(52) U.S. Cl.
USPC .................... 726/17; 726/28; 386/261

(58) Field of Classification Search
USPC ............... 726/16–21, 26–28; 382/115–126; 725/25, 27–30; 340/309.16
See application file for complete search history.

(56) References Cited

U.S. PATENT DOCUMENTS

| | | | | |
|---|---|---|---|---|
| 2005/0240959 A1* | 10/2005 | Kuhn et al. | | 725/25 |
| 2009/0064314 A1* | 3/2009 | Lee | | 726/17 |
| 2010/0088620 A1* | 4/2010 | Tran et al. | | 715/764 |
| 2010/0239227 A1* | 9/2010 | Bhogal et al. | | 386/83 |

* cited by examiner

*Primary Examiner* — Philip Chea
*Assistant Examiner* — Trong Nguyen (57) ABSTRACT

A system biometrically authenticates a user that intends to use an entertainment device. The system obtains, based on the biometric authentication, one or more quotas associated with an amount of time that the user may use the entertainment device, and controls the user's use of the entertainment device based on the one or more quotas.

20 Claims, 10 Drawing Sheets

DYNAMIC QUOTA-BASED ENTERTAINMENT MANAGER

BACKGROUND

With the widespread availability of electronic-based entertainment in the home, including video/audio programming and video games, many parents have sought to control and/or restrict the ability of their children to watch or play the video/audio programming and video games. Such controls have typically included fixed or static parental controls that only allow children to watch/play programming and/or games having specific ratings.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary implementations described herein include flexible and dynamic quota-based restriction mechanisms, instead of or in addition to existing fixed or static control mechanisms, that may be used to encourage entertainment device users (e.g., children) to watch/play approved programming/games (i.e., parentally approved) and to follow approved schedules for school and/or homework activities when using their entertainment devices.

Figure 1:
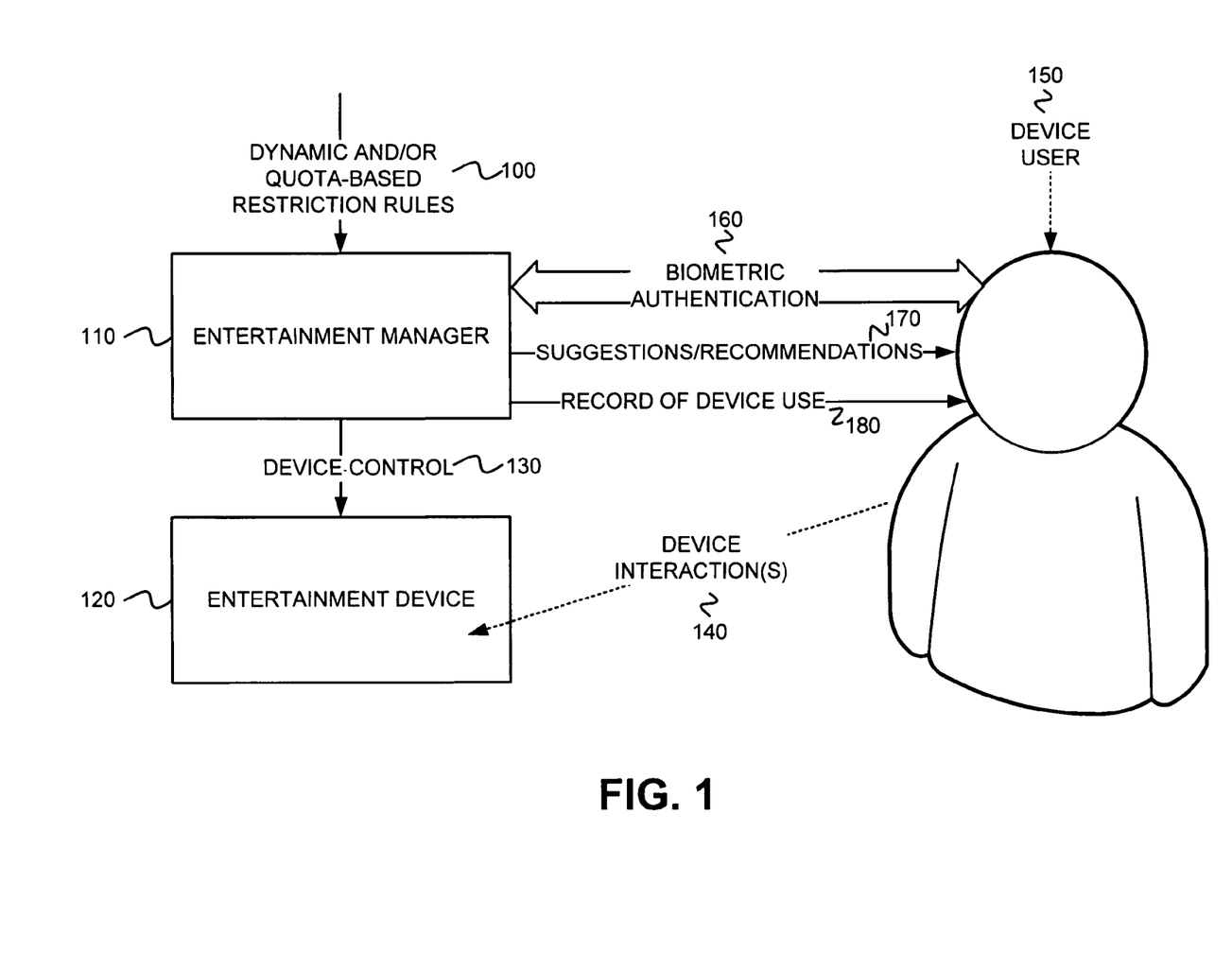
FIG. 1 is a diagram depicting an overview of the use of dynamic and/or quota-based restriction rules for controlling an entertainment device user's interaction with an entertainment device.

FIG. 1 depicts an overview of the use of dynamic and/or quota-based restriction rules for controlling an entertainment device user's interaction with an entertainment device. As shown in FIG. 1, dynamic and/or quota-based restriction rules 100 may be supplied to an entertainment manager 110 which may further supply device control signals 130 to an entertainment device 120, based on the dynamic and/or quota-based restriction rules 100, for controlling interactions 140 between a device user 150 and entertainment device 120. Entertainment device 120 may include a television, a set-top box (STB), a gaming device, a computing device, or the like that provides video programming and/or games to device user 150. The dynamic and/or quota-based restriction rules 100 may include rules input by a "supervising" user of entertainment manager 110 who has "supervisory" authority to set restriction rules with respect to one or more users (alternatively called "family members" herein). The dynamic and/or quota-based restriction rules 100 may include, for example, time quotas that specify an amount of time users (i.e., family members) may use certain entertainment devices (e.g., a specific family member may only watch 10 hours of television per week), time quotas that specify an amount of time per activity type that users may use certain entertainment devices (e.g., 2 hours of cartoons per week maximum, 3 hours of educational programming per week maximum, etc.), and/or time quotas based on a customizable calendar (e.g., a personal calendar or a family calendar that sets forth certain restrictions on dates or times).

Entertainment manager 110 may supply device control signals 130 to entertainment device 120 based additionally on biometric authentication 160 of device user 150. Biometric authentication 160 may include any type of technique for authenticating an identity of a user of entertainment device 120 including, for example, physiological or behavioral biometric authentication techniques. The physiological biometric authentication techniques may include fingerprint, facial recognition, hand/palm geometry, iris/retina recognition, DNA, or odor biometric authentication techniques. The behavioral biometric authentication techniques may include, for example, signature verification or voice recognition. Other biometric authentication techniques, not described here, may also be used.

As further shown in FIG. 1, entertainment manager 110 may provide suggestions/recommendations 170 to device user 150. The suggestions and/or recommendations 170 may include suggested/recommended programming and/or games and may be provided based on the quota-based restriction rules and/or based on other factors. As additionally shown in FIG. 1, entertainment manager 110 may provide a record 180 of device user 150's use of entertainment device 120 to device user 150 (or to the "supervisory" user or other users). The record 180 of device user 150's use of entertainment device 120 may include, for example, an amount of time device user 150 used entertainment device 120 and may further include an analysis of device user 150's use of entertainment device 120.

Figure 2:
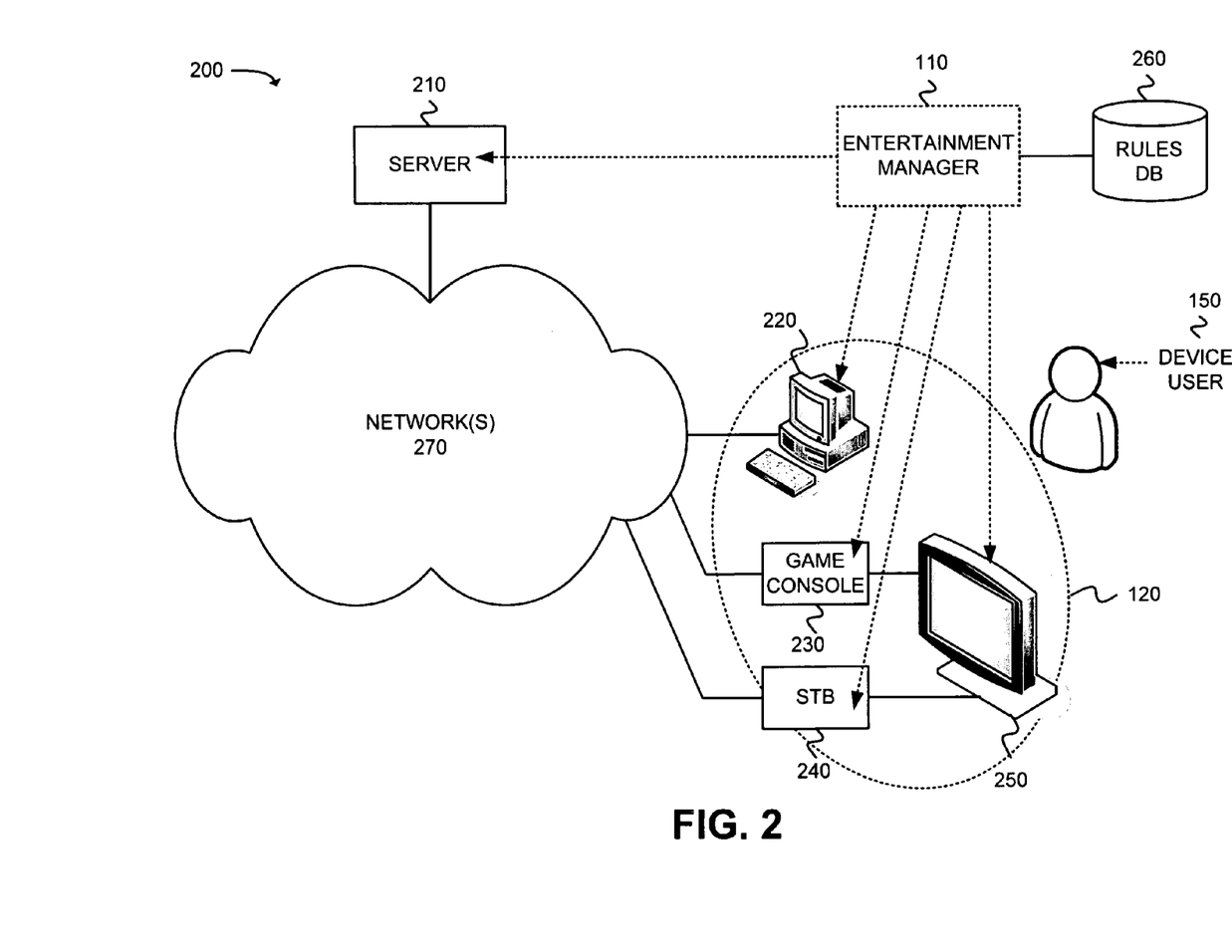
FIG. 2 is a diagram of an exemplary network in which aspects described herein may be implemented.

FIG. 2 is a diagram of an exemplary network 200 in which exemplary aspects described herein may be implemented. As shown, network 200 may include a server 210, a computer 220, a game console 230, a set-top box (STB) 240, a display device 250, entertainment manager 120, a rules database (DB) 260, and a network 270. One or more of computer 220, game console 230, STB 240 and/or display device 250 may correspond to entertainment device 120 of FIG. 1.

Server 210 may include a server entity that provides entertainment to device user 150 via network 270 and one or more of computer 220, game console 230, STB 240 and/or display device 250. The entertainment may include, but is not limited to, video programming (e.g., television (TV) programming) and video games. Computer 220 may include a computational device, such as, for example, a laptop or desktop computer, that may present entertainment (e.g., video games, video programming) to device user 150. Game console 230 may include a gaming device that may present games (e.g., video games) to device user 150 via display device 250. STB 230 may include a device that can receive and present video programming to device user 150 via display device 250. The video programming may include, for example, television programming, video on-demand, etc. Display device 250 may display video programming received from game console 230 or STB 240.

Entertainment manager 110 may supply, as described in further detail below, control signals to server 210, computer 220, game console 230, STB 240 or display device 250 based on dynamic and/or quota-based restriction rules so as to control interactions between device user 150 and server 210, computer 220, game console 230, STB 240 or display device 250. Rules DB 260 may store dynamic and/or quota-based restriction rules received by entertainment manager 110. Entertainment manager 110 may be implemented in server 210, computer 220, game console 230 and/or STB 240. In some implementations, entertainment manager 110 may not be implemented in server 210, computer 220, game console 230, or STB 240, but may be implemented in a node within network 270, or elsewhere. Network 270 may include one or more networks of any type, including for example, a local area network (LAN), a wide area network (WAN), a metropolitan area network (MAN), an intranet, the Internet, a wireless satellite network, an optical network, and/or a wireless public land mobile network (PLMN).

Figure 3:
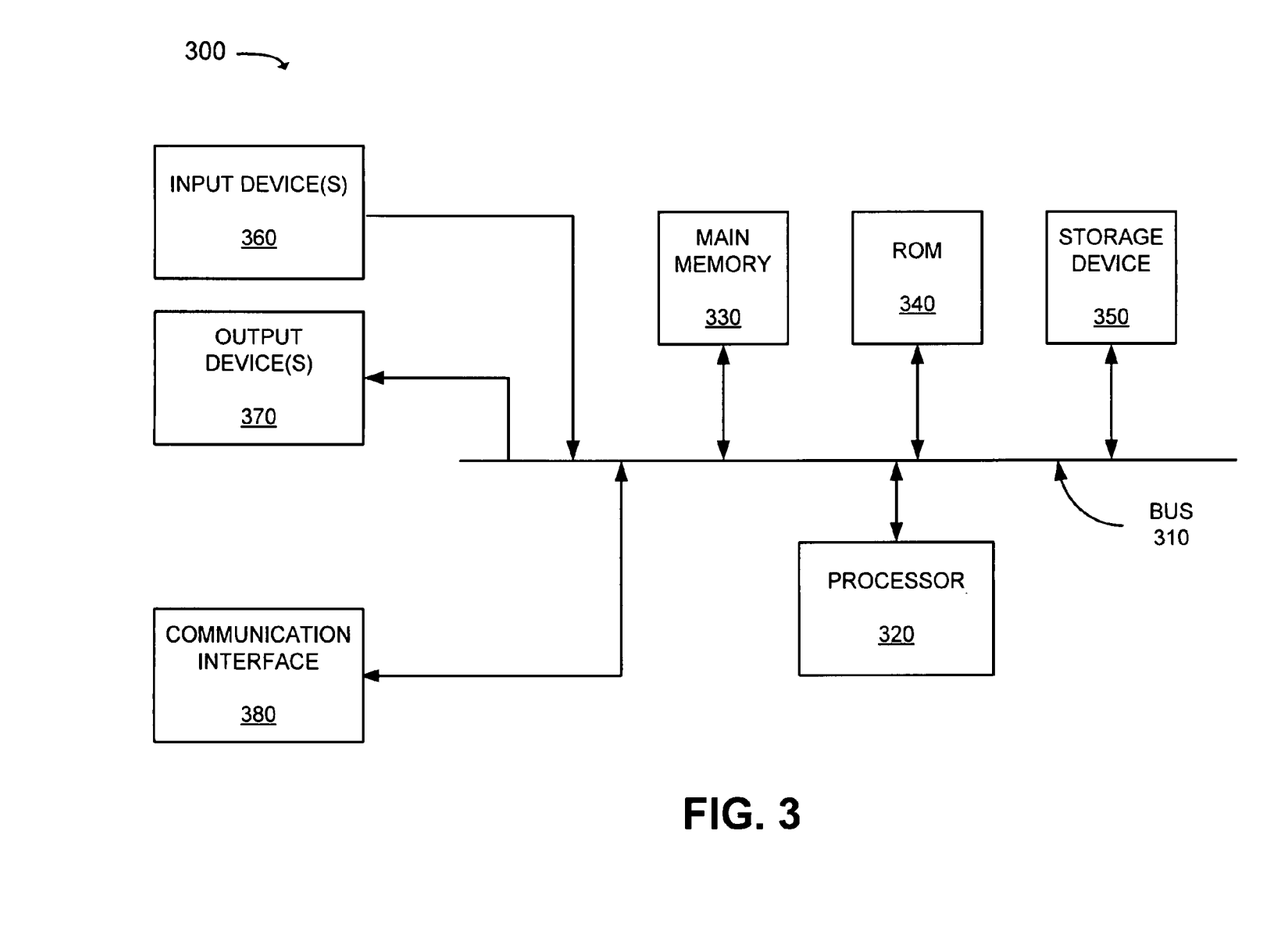
FIG. 3 is a diagram of an exemplary device that may correspond to one or more devices of FIG. 2.

FIG. 3 is a diagram of a device 300 according to an exemplary implementation. Device 300 may correspond to server 210, computer 220, game console 230 or STB 240. Device 300 may include a bus 310, a processor 320, a main memory 330, a read only memory (ROM) 340, a storage device 350, an input device 360, an output device 370, and a communication interface 380. Bus 310 may include a path that permits communication among the elements of device 300.

Processor 320 may include, for example, a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device(s) 360 may include one or more mechanisms that permit an operator to input information to device 300, such as a keyboard, a mouse, a pen, voice recognition and/or biometric mechanisms, etc. Output device(s) 370 may include one or more mechanisms that output information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network.

Device 300 may perform certain operations or processes, as will be described in detail below. Device 300 may perform these operations in response to processor 320 executing software instructions contained in a computer-readable medium, such as memory 330. A computer-readable medium may be defined as a physical or logical memory device.

The software instructions may be read into memory 330 from another computer-readable medium, such as storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

Figure 4:
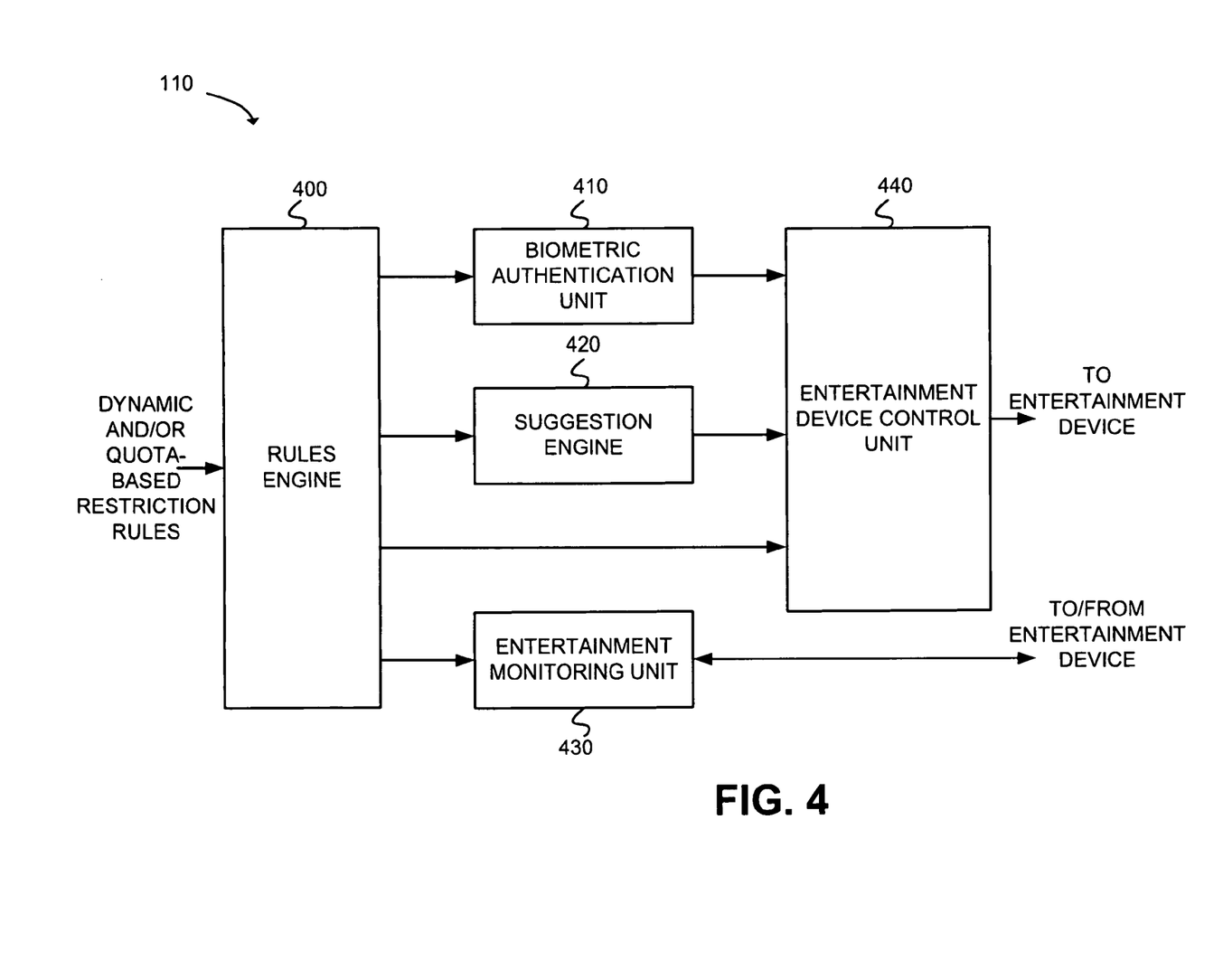
FIG. 4 is an exemplary diagram of functional components of the entertainment manager of FIGS. 1 and 2.

FIG. 4 is an exemplary diagram of functional components of entertainment manager 110. The functional components of entertainment manager 110 may be implemented by, for example, processor 320. Entertainment manager 110 may include a rules engine 400, a biometric authentication unit 410, a suggestion engine 420, an entertainment monitoring unit 430 and an entertainment device control unit 440.

Rules engine 400 may receive dynamic and/or quota-based restriction rules from users (e.g., from a "supervisory" user) and may store the received restriction rules in rules DB 260 (not shown). The received restriction rules may also include an identification of the users to whom the restriction rules apply. Rules engine 400 may access and retrieve restriction rules stored in rules DB 260 and may supply the restriction rules to authentication unit 410, suggestion engine 420, entertainment device control unit 440 or entertainment monitoring unit 430.

Biometric authentication unit 410 may include mechanisms for authenticating an identity of a user of an entertainment device. Unit 410 may employ any type of biometric authentication technique including, for example, fingerprint, facial recognition, hand/palm geometry, iris/retina recognition, DNA, odor, signature verification or voice recognition biometric authentication techniques. Suggestion engine 420 may provide suggestions and/or recommendations of specific entertainment (e.g., TV programming or video games) based on the restriction rules and/or based on other factors. Suggestion engine 420 may take into account overall quota/allowance restrictions and/or pre-defined parameters set by parents. Suggestion engine 420 may provide an output suggestion based on the following relation:

$$\text{Suggestion} = \text{function of [family member's relevancy weightage, "supervisory" user's weightage, remaining quota]} \qquad \text{Eqn. (1)}$$

The family member's relevancy weightage may be based, for example, on weights associated with a family member's use of entertainment device 120 (i.e., categories of programs used by the family member are assigned higher weights). The "supervisory" user's weightage may be based, for example, on explicit weights assigned to categories of programming by the "supervisory" user.

Entertainment monitoring unit 430 may monitor and record a device user's use of entertainment device 120. Monitoring unit 430 may, for example, monitor the specific television programming that the user watches or may monitor the amount of time the user spends watching specific television programming or specific types of television programming. Entertainment device control unit 440 may provide control signals to the entertainment device to control the operation of the entertainment device.

Figure 5:
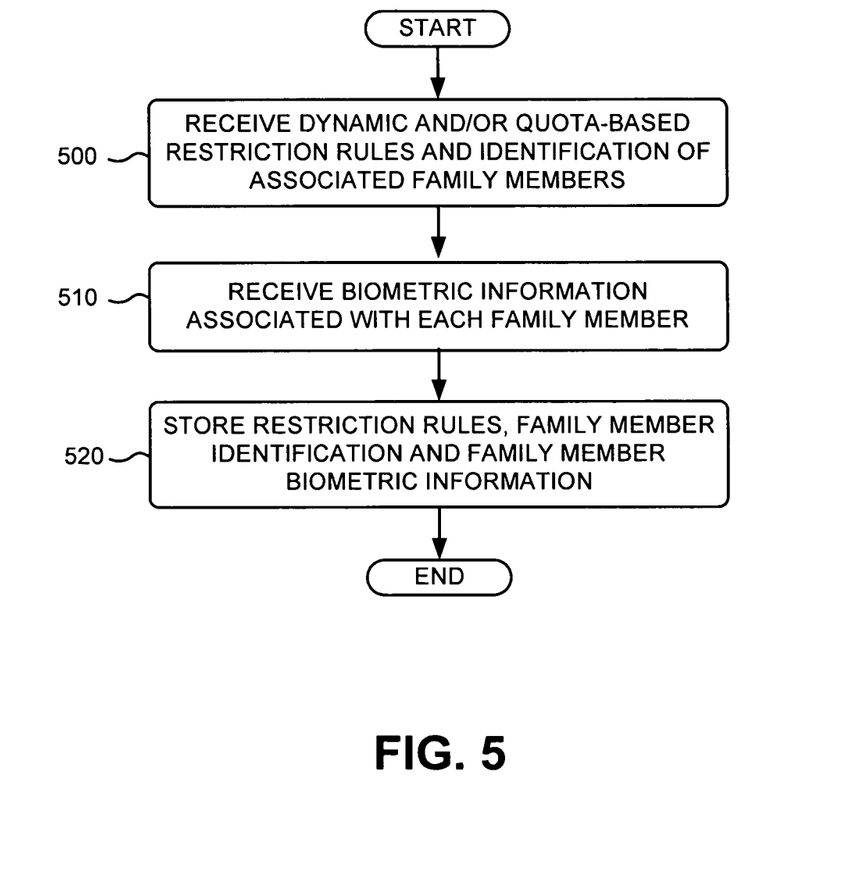
FIG. 5 is a flow diagram illustrating an exemplary process for receiving dynamic and/or quota-based restriction rules at the entertainment manager of FIGS. 1 and 2.

FIG. 5 is a flow diagram illustrating an exemplary process for receiving, at entertainment manager 120, dynamic and/or quota-based restriction rules associated with at least one family member.

The exemplary process may begin with receipt of dynamic and/or quota-based restriction rules and an identification of associated family members (block 500). The restriction rules may, for example, specify a total amount of hours that the entertainment device may be used per a certain period of time (e.g., 10 hours of TV programming per week) and/or, a total amount of hours that the entertainment device may be used per week per activity type (e.g., per genre of TV programming, per individual TV program). Rules engine 400 may receive the restriction rules and the identification of associated family members via a user interface that may be textual, graphical, or a combination of both.

Figure 6:
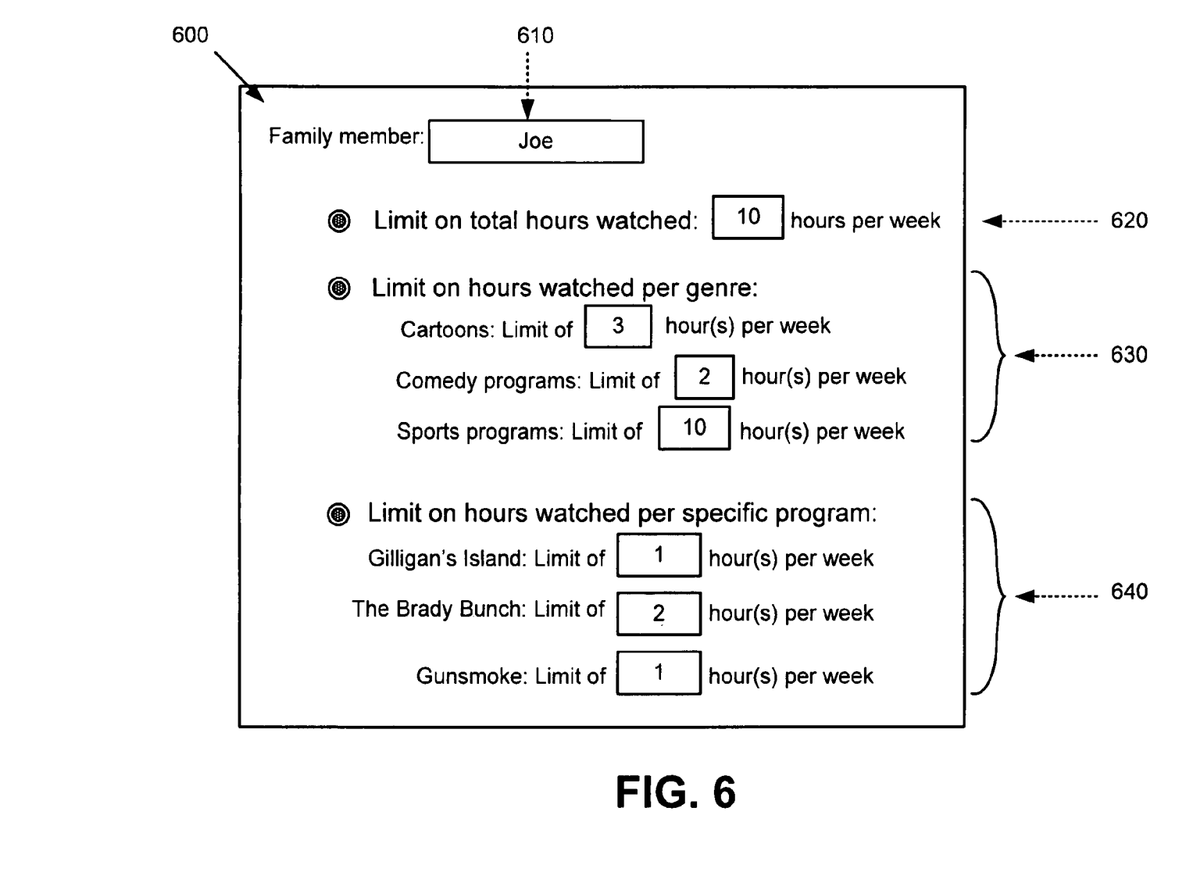
FIG. 6 is a diagram that depicts an exemplary text-based interface for entry of dynamic and/or quota-based restriction rules.

FIG. 6 depicts an exemplary text-based interface 600 for entry of dynamic and/or quota-based restriction rules associated with watching television programming. As shown in FIG. 6, a "supervisory" user may enter a family member identifier 610 into interface 600 followed by one or more quota-based restriction rules. For example, as shown in FIG. 6, a limit 620 on total hours of watched may be entered into interface 600. A limit 630 on hours watched per genre of TV programming may further be entered into interface 600. A limit 640 on hours watched per specific television program may also be entered into interface 600.

Figure 7:
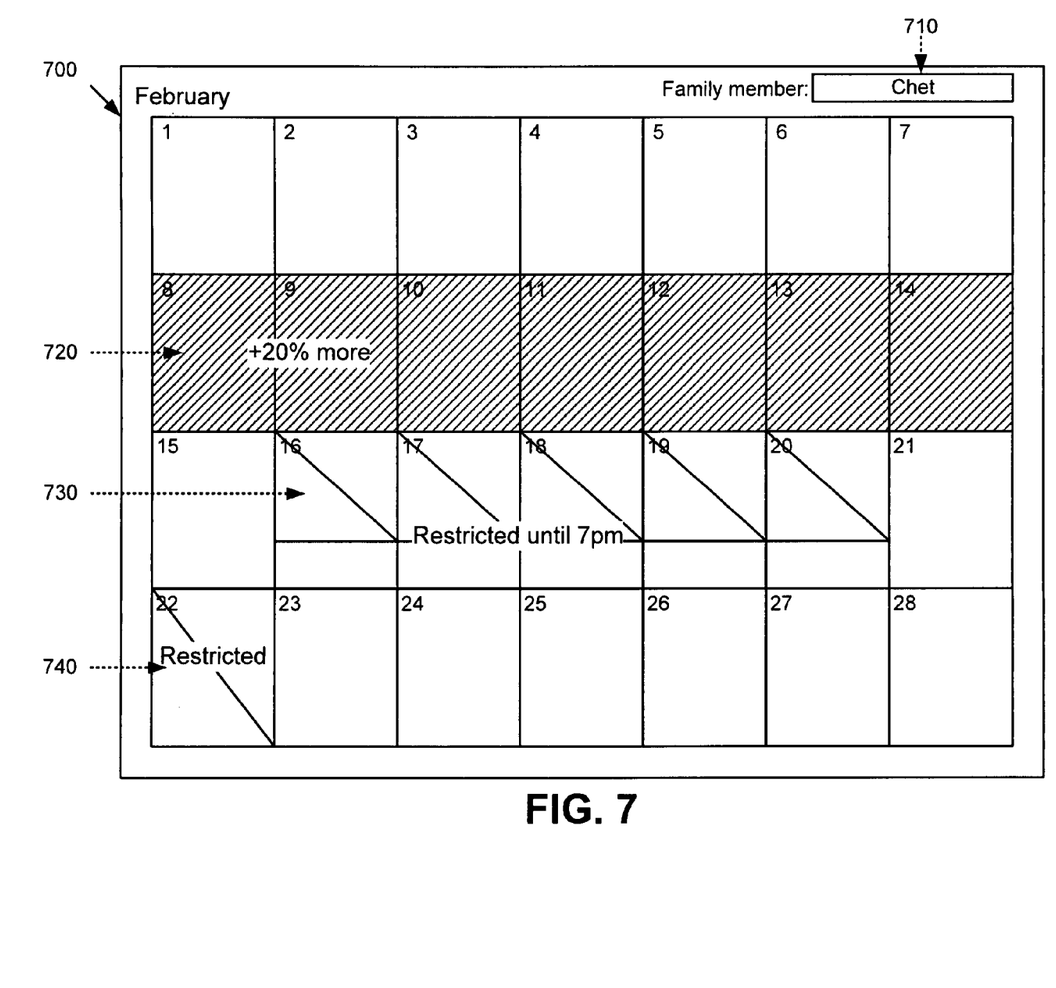
FIG. 7 is a diagram that depicts an exemplary calendar-based interface for entry of dynamic and/or quota-based restriction rules.

FIG. 7 depicts an exemplary calendar-based interface 700 for entry of dynamic and/or quota-based restriction rules. As shown in FIG. 7, a "supervisory" user may enter a family member identifier 710 into interface 700 followed by calendar-based restriction rules. The calendar-based restriction rules may include, for example, the specification of a period 720 on the calendar during which the family member may watch more or less television programming than the base quota. For example, FIG. 7 depicts a period 720 (e.g., a week) during which the family member may watch an additional 20% more television programming. The calendar-based restriction rules may include, for example, specification of a period 730 during which use of the entertainment device is restricted each day over a specified time period. FIG. 7 depicts a period 730 during which a family member may not watch television programming until 7 pm in the evening (e.g., during school days). The calendar-based restriction rules may further include, for example, specification of certain days on the calendar during which the family member many not use the entertainment device. FIG. 7, for example, depicts a specified day 740 on the calendar during which the family member is restricted from using the entertainment device.

Returning to FIG. 5, biometric information associated with each family member may be received (block 510). For example, biometric authentication unit 410 may obtain biometric information from each family member desiring to use the entertainment device. For example, if facial recognition is employed, biometric authentication unit 410 may use a camera to obtain an image or video of the family members in the vicinity of the entertainment device and may use facial recognition techniques to obtain facial recognition biometric information for each family member. Biometric authentication unit 410 may supply the biometric information to rules engine 400.

The restriction rules, family member identification, and family member biometric information may be stored (block 520). For example, rules engine 400 may store the restriction rules, family member identification and family member biometric information in rules DB 260 for future retrieval.

Figure 8:
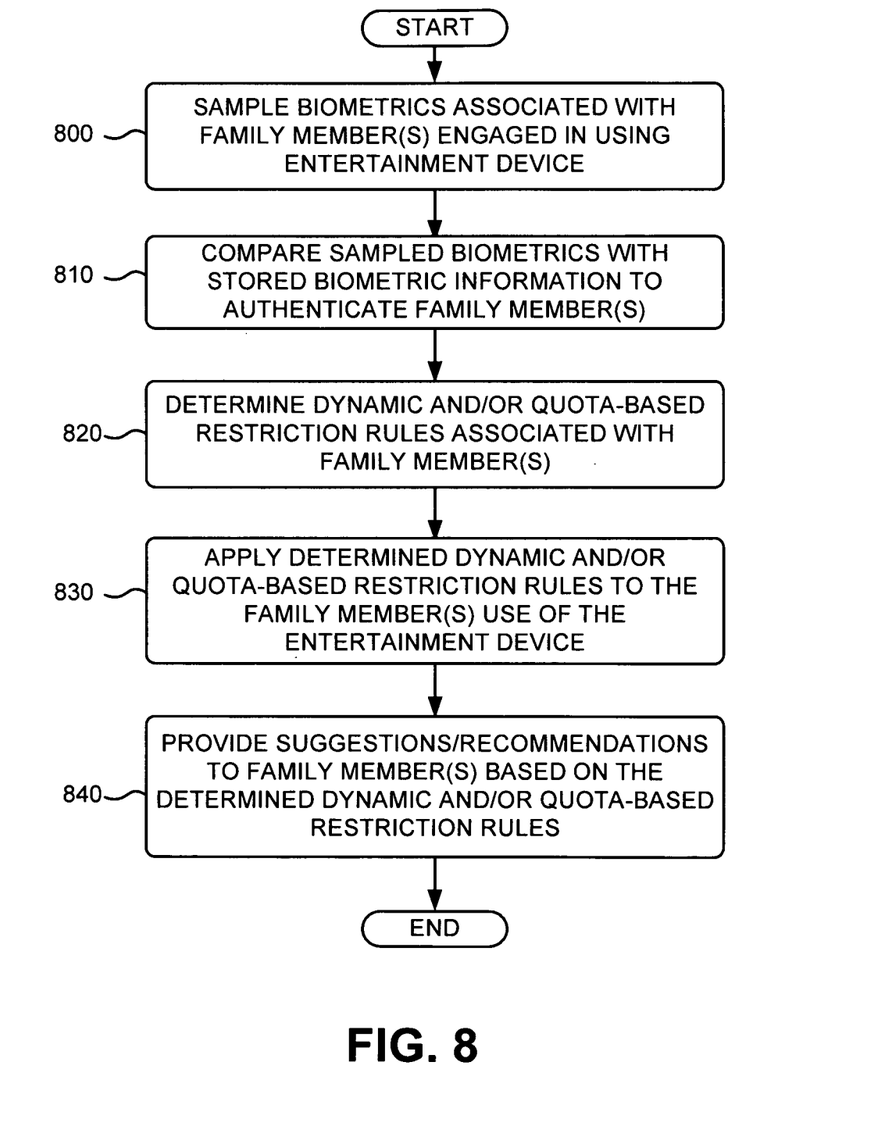
FIG. 8 is a flow diagram illustrating an exemplary process for applying dynamic and/or quota-based restriction rules to family members' use of an entertainment device.

FIG. 8 is a flow diagram illustrating an exemplary process for applying dynamic and/or quota-based restriction rules to family member(s) use of an entertainment device. The exemplary process of FIG. 8 may be implemented by entertainment manager 110.

The exemplary process may begin with sampling one or more biometrics associated with family member(s) engaged in using an entertainment device (block 800). Depending on what biometric authentication technique is used, different biometrics may be sampled. For example, if facial recognition biometric authentication is being used, then a camera may obtain an image or video of a family member and the image or video may be subjected to facial recognition analysis.

A comparison of the sampled biometrics with stored biometric information may be made to authenticate the family members (block 810). Each family member may have previously stored biometric information and the sampled biometrics may be compared with the previously stored biometric information. For example, the results of facial recognition analysis of a family member may be compared with previously stored facial recognition data.

Dynamic and/or quota-based restriction rules associated with the family member(s) may be determined (block 820). Rules engine 400 may retrieve restriction rules from rules DB 260 that correspond to the family member or members authenticated in block 810.

The determined dynamic and/or quota-based restriction rules may be applied to the family member(s) use of the entertainment device (block 830). For example, if the determined restriction rules indicate that the authenticated family member has a quota of 10 hours of television programming per week, then entertainment device control unit 440 of entertainment manager 110 may block the authenticated family member from watching anymore television programming beyond the 10 hour quota.

Suggestions and/or recommendation may be provided to the family member(s) based on the determined dynamic and/or quota-based restriction rules (block 840). Suggestion engine 420 may provide suggestions and/or recommendations based on, for example, the suggestion function set forth in Eqn. (1) above.

Figure 9:
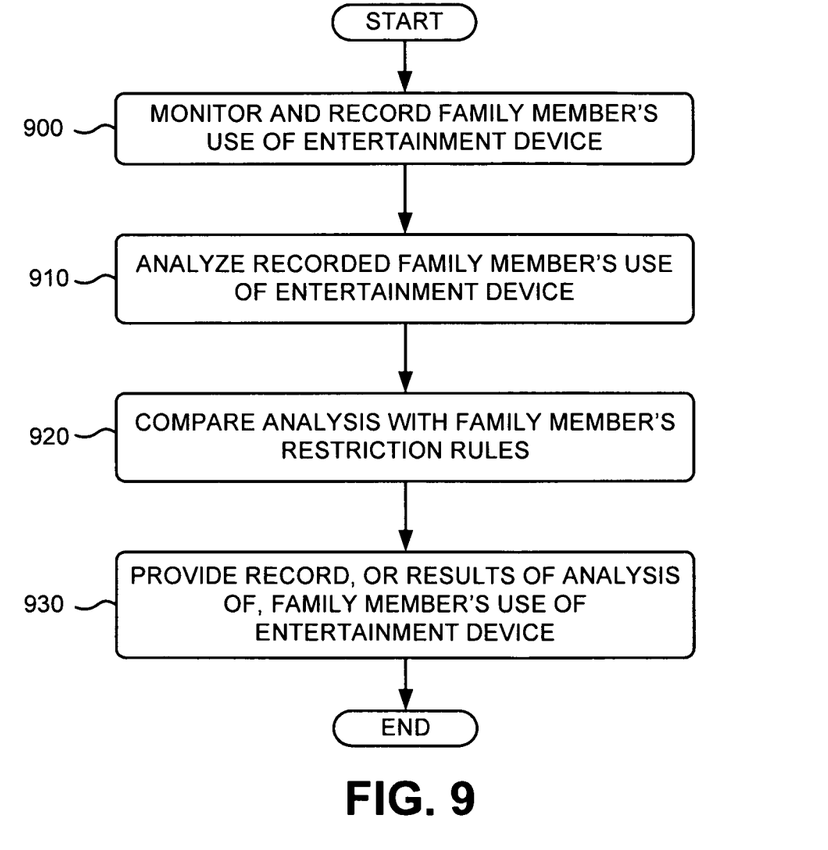
FIG. 9 is a flow diagram illustrating an exemplary process for monitoring and analyzing a family member's use of an entertainment device and providing the results of the monitoring and analysis.

FIG. 9 is a flow diagram illustrating an exemplary process for monitoring and analyzing a family member's use of an entertainment device and providing the results of the monitoring and analysis. The exemplary process of FIG. 9 may be implemented by entertainment manager 110.

The exemplary process may begin with entertainment manager 120 monitoring and recording a family member's use of entertainment device 120 (block 900). Entertainment monitoring unit 430 may monitor and record each family member's use of entertainment device 120 and store the recorded use in memory. The recorded use may include, for example, a number of hours spent with a specific activity type (e.g., 4 hours watching comedy programming, 6 hours playing video games, etc.).

The recorded family member's use of entertainment device 120 may be analyzed (block 910). Entertainment monitoring unit 430 may, for example, analyze the recorded family member's use of entertainment device 120 to determine the family member's overall viewing/playing habits. The results of the analysis may be compared with the family member's restriction rules (block 920). For example, the analysis may determine how many more or fewer hours that the family member used entertainment device 120 relative to any quotas specified in the restriction rules.

Figure 10:
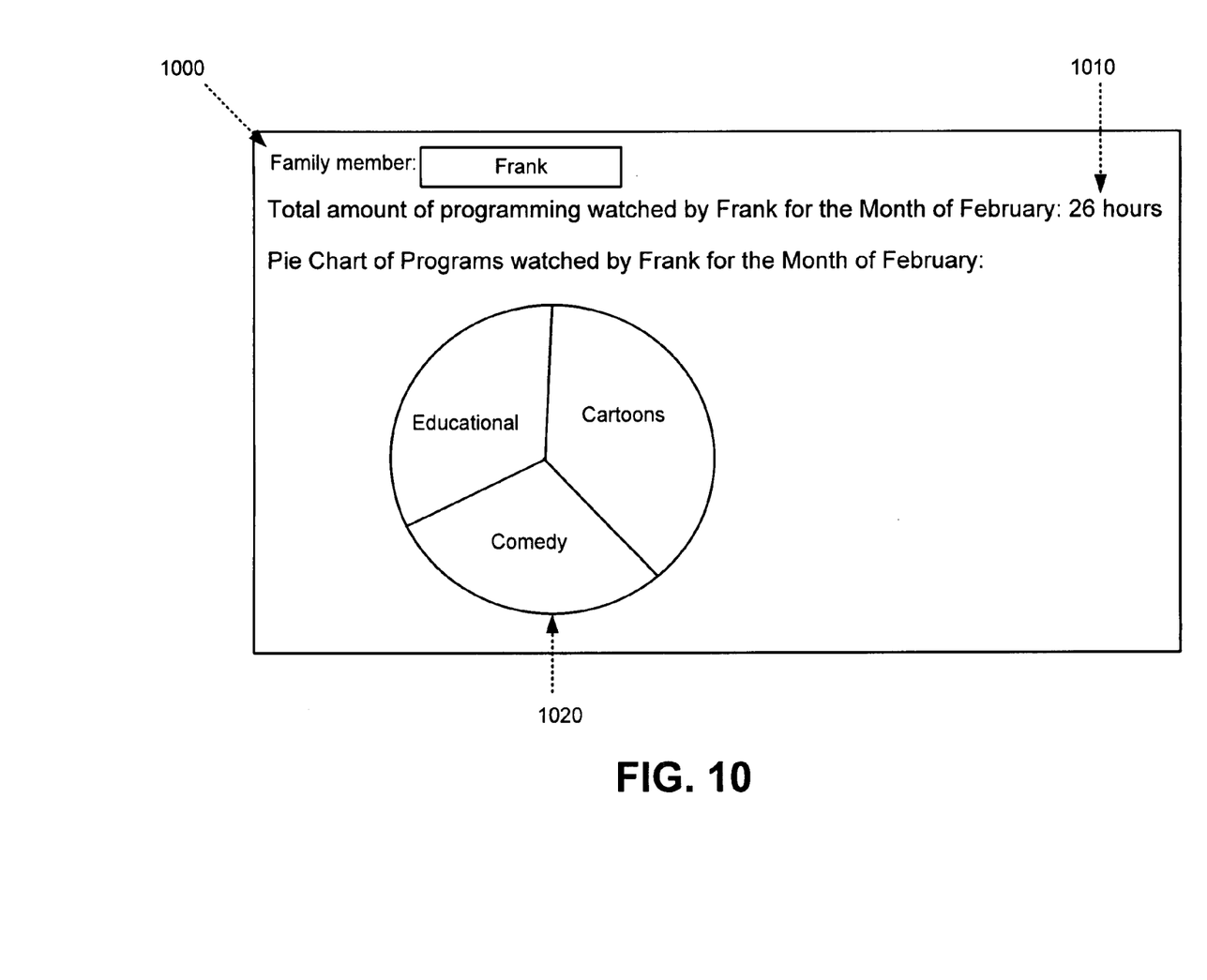
FIG. 10 is a diagram that depicts an exemplary display window for displaying the results of the monitoring and analysis of a family member's use of an entertainment device.

The results of the analysis of the family member's use of entertainment device 120 may be provided (block 930). FIG. 10 depicts an exemplary display window 1000 for displaying the results of the monitoring and analysis of the family member's use of entertainment device 120. As shown in FIG. 10, display window 1000 may display a total amount of programming 1010 watched by family member Frank during the month of February. Display window 1000 may additionally display a pie chart 1020 of programming watched by Frank during the month of February, clearly indicating the relative amounts Frank watched each type of television programming.

In the preceding description, various implementations have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention. For example, while a series of blocks has been described with regard to FIGS. 5, 8 and 9, the order of the blocks may be modified in other implementations consistent with the principles of the invention. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a processor and from a first user, dynamic restriction rules associated with use of an entertainment device by a second user through a calendar-based interface,
      the first user and the second user being different, and
      the calendar-based interface including a highlighted specification of a time period on a calendar during which the second user may watch an amount of video programming above a base quota,
         the amount being displayed, in the calendar-based interface, in association with the highlighted specification of the time period;
   determining, by the processor and based on the dynamic restriction rules, a plurality of quotas associated with amounts of time that the second user may use the entertainment device,
      the plurality of quotas corresponding to respective amounts of time that the second user may use the entertainment device to access a plurality of different genres of video programming;
   biometrically authenticating, by the processor, the second user when the second user attempts to use the entertainment device; and
   controlling, by the processor and based on biometrically authenticating the second user, a use of the entertainment device, by the second user, using the plurality of quotas,
      the controlling the use of the entertainment device by the second user including:
         suggesting, to the second user, a program to be accessed through the entertainment device based on a function of at least weights associated with use of the entertainment device by the second user and explicit weights assigned to categories of programming by the first user.

2. The method of claim 1, where the entertainment device comprises one or more of:
   a computer,
   a set-top box (STB),
   a game console, or
   a television.

3. The method of claim 1, where the plurality of quotas include a total amount of time that the second user is permitted to use the entertainment device over a specific time period, and
   where suggesting the program includes:
      determining a remaining portion, of the total amount of time, that is unused by the second user; and
      determining the program further based on the remaining portion.

4. The method of claim 3, where:
   the specific time period includes a first time period and a second time period,
   a first quota, of the plurality of quotas, is associated with use, by the second user during the first time period, of the entertainment device, and
   a second quota, of the plurality of quotas, is associated with use, by the second user during the second time period, of the entertainment device.

5. The method of claim 1, where the plurality of quotas further include respective amounts of time, over a specific time period, that the second user is permitted to access, via the entertainment device, the plurality of different genres of video programming.

6. The method of claim 5, where the plurality of quotas are associated with particular video programs included in the plurality of different genres of video programming, and
   where the plurality of quotas includes amounts of time, during the specific time period, that the second user is permitted to access, via the entertainment device, the particular video programs.

7. The method of claim 1, where biometrically authenticating the second user comprises:
   storing biometric information specific to the second user;
   obtaining biometric information; and
   identifying the second user based on comparing the stored biometric information and the obtained biometric information.

8. The method of claim 7, where obtaining the biometric information comprises:
   obtaining an image or video of the second user, and
   where identifying the second user includes:
      identifying the second user based on the obtained image or video.

9. The method of claim 1, where the plurality of quotas are associated with a specific time period, and
   where determining the plurality of quotas includes:
      tracking use, by the second user during another time period, of the entertainment device,
         where the other time period is prior to the specific time period; and
      dynamically updating the plurality of quotas based on tracking the use of the entertainment device, by the second user, during the other time period.

10. A system associated with an entertainment device, the system comprising:
   a biometric authentication processor to biometrically authenticate a particular user, of a plurality of users who intend to use the entertainment device;

a memory to:
  store dynamic restriction rules associated with the plurality of users, the dynamic restriction rules being received from a first user, who differs from the particular user, through a calendar-based interface,
    the dynamic restriction rules including a plurality of quotas corresponding to amounts of time the particular user may use the entertainment device to access a plurality of different genres of video programming, and
    the calendar-based interface including a highlighted specification of a time period on a calendar during which the particular user may watch an amount of video programming above a base quota,
      the amount being displayed, in the calendar-based interface, in association with the highlighted specification of the time period;
a control processor to:
  determine, based on the biometric authentication and the stored restriction rules, a group of quotas of the plurality of quotas associated with the particular user, and
  control use, by the particular user, of the entertainment device based on the group of quotas; and
  suggest, to the particular user, a program to be accessed through the entertainment device based on a function of at least weights associated with use of the entertainment device by the particular user and explicit weights assigned to categories of programming by the first user.

11. The system of claim 10, where the biometric authentication processor, when authenticating the particular user, is further to:
  obtain an image or video of the particular user; and
  identify the particular user based on the obtained image or video.

12. The system of claim 10, where the entertainment device comprises one or more of:
  a computer,
  a set-top box (STB),
  a game console, or
  a television.

13. The system of claim 10, where the group of quotas include a first quota indicating a total amount of time that the particular user is permitted to use the entertainment device over a specific time period.

14. The system of claim 13, where the specific time period includes a first time period and a second, different time period,
  where a second quota, of the group of quotas, is associated with use, by the particular user during the first time period, of the entertainment device, and
  where a third quota, of the group of quotas, is associated with use, by the particular user during the second time period, of the entertainment device.

15. The system of claim 10, where the group of quotas are associated with different video programs included in the plurality of different genres of video programming, and
  where the group of quotas indicates total amounts of time that the particular user is permitted to use the entertainment device over a specific time period to access the different video programs.

16. A system comprising:
  means for receiving, from a first user, dynamic restriction rules through a calendar-based interface,
    the calendar-based interface including a highlighted specification of a time period on a calendar during which a second user may watch an amount of video programming above a base quota,
      the amount being displayed, in the calendar-based interface, in association with the highlighted specification of the time period;
  means for biometrically authenticating the second user associated with an entertainment device, the second user being different from the first user;
  means for obtaining, based on the dynamic restriction rules and biometrically authenticating the second user, a plurality of quotas corresponding to amounts of access by the second user, via the entertainment device, to a plurality of different genres of video programming;
  means for controlling, based on the plurality of quotas, use of the entertainment device by the second user; and
  means for suggesting, to the second user, a program to be accessed through the entertainment device based on a function of at least weights associated with the use of the entertainment device by the second user and explicit weights assigned to categories of programming by the first user.

17. A non-transitory computer readable memory storing instructions, the instructions comprising:
  one or more instructions which, when implemented by a computer device, cause the computer device to store a plurality of dynamic access rules corresponding to total amounts of time that a plurality of users may access, via an entertainment device, a plurality of different genres of video programming,
    the plurality of access rules being received from a first user through a calendar-based interface,
    the calendar-based interface including a highlighted specification of a time period on a calendar during which a second user may watch an amount of video programming above a base quota,
      the amount being displayed, in the calendar-based interface, in association with the highlighted specification of the time period;
  one or more instructions which, when implemented by the computer device, cause the computer device to collect biometric information associated with the second user of the plurality of users;
  one or more instructions which, when implemented by the computer device, cause the computer device to identify, based on the collected biometric information, the second user;
  one or more instructions which, when implemented by the computer device, cause the computer device to obtain two or more access rules, of the plurality of access rules, associated with the second user;
  one or more instructions which, when implemented by the computer device, cause the computer device to control, based on the obtained two or more access rules, use of the entertainment device by the second user during a time period,
    where the one or more instructions to control the use of the entertainment device include:
      one or more instructions to monitor, during the time period, a prior amount of time that the second user has accessed, via the entertainment device, one of the plurality of different genres of video programming,
      one or more instructions to receive a request, from the second user, for additional access, via the entertainment device during the time period, to the one of the plurality of different genres of video programming, one or more instructions to compare, based on receiving the request, the prior amount of time to a total amount of time, in the two or more access rules, associated with the one of the plurality of different genres of video programming, and one or more instructions to allow, when the prior amount of time is less than the total amount of time, the second user to use the entertainment device for the additional access to the one of the plurality of different genres of video programming; and one or more instructions which, when implemented by the computer device, cause the computer device to suggest, to the second user, a program to be accessed through the entertainment device based on a function of at least first weights associated with use of the entertainment device by the second user and second weights assigned to categories of programming by the first user.

18. The non-transitory computer readable memory of claim 17, where the instructions further comprise:

one or more instructions which, when implemented by the computer device, cause the computer device to track use, by the plurality of users during another time period, of the entertainment device, where the other time period is prior to the time period; and one or more instructions which, when implemented by the computer device, cause the computer device to dynamically update the plurality of access rules based on the tracked use of the entertainment device during the other time period.

19. The non-transitory computer readable memory of claim 17, where the plurality of access rules are associated with different programs included in the plurality of different genres of video programming, and where the two or more access rules include amounts of time, during the time period, that the second user is permitted to access, via the entertainment device, the different programs.

20. The non-transitory computer readable memory of claim 17, where the instructions further comprise:

one or more instructions that, when implemented by the computer device, cause the computer device to:

track use, by the second user, of the entertainment device during another time period, where the other time period is prior to the time period; and assign the first weights to the plurality of different genres of programming based on the tracked use.

* * * * *